Nov. 11, 1952 — H. F. TAYLOR — 2,617,190
SLICER
Filed Nov. 8, 1948
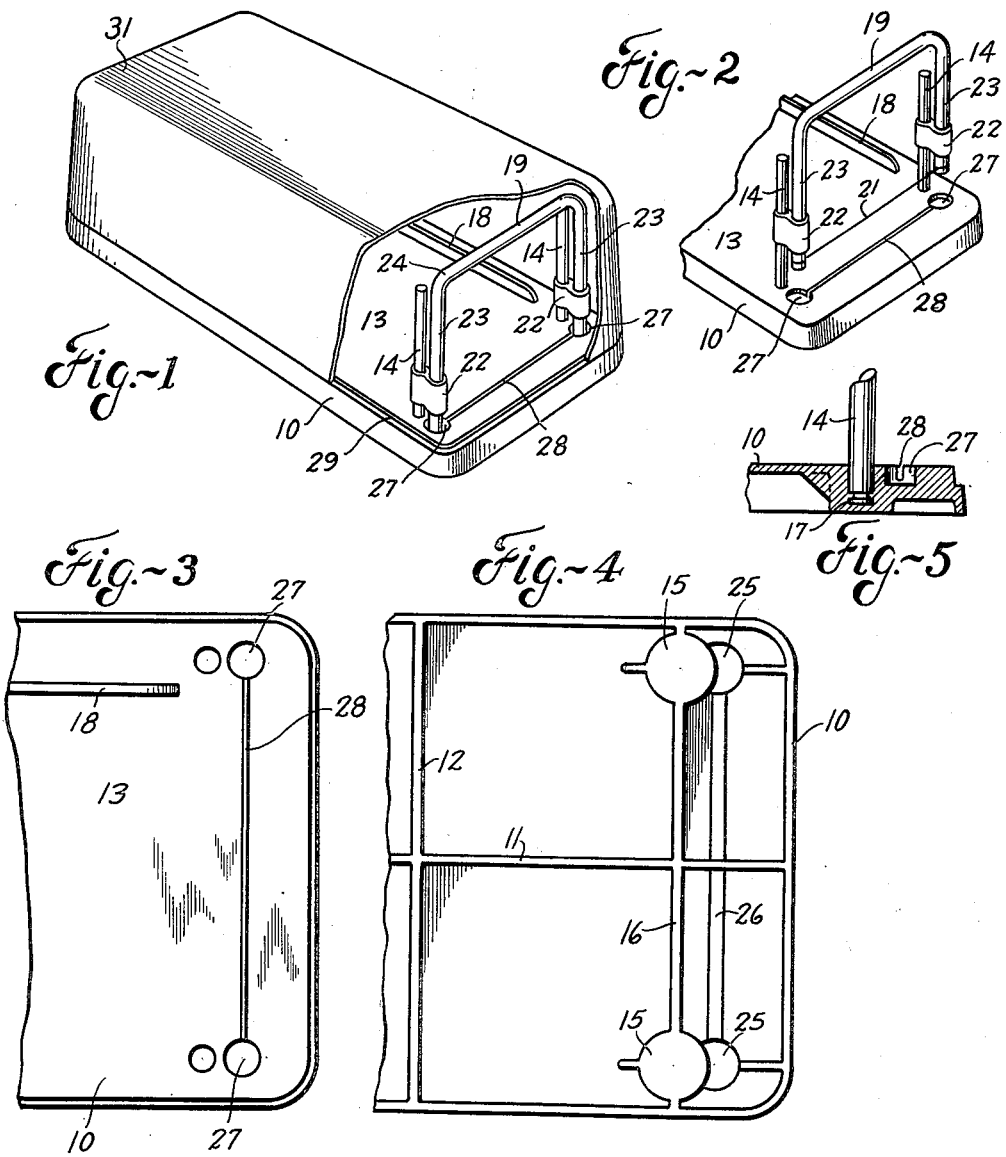
Harold F. Taylor, Inventor
By Tom Walker, Attorney Patented Nov. 11, 1952

2,617,190

UNITED STATES PATENT OFFICE 2,617,190

SLICER

Harold F. Taylor, Springfield, Ohio, assignor to Tapco, Inc., Springfield, Ohio, a corporation of Ohio Application November 8, 1948, Serial No. 58,841

1 Claim. (Cl. 31—25)

This invention relates to a food storage and slicing device, useful in homes and restaurants to preserve the freshness of a food and to aid in the serving of selected portions thereof.

Although not limited thereto, the invention is particularly applicable to the serving of cheese from the processed loaves or bricks sold for home consumption in one and two pound packages. Such cheese is wrapped to preserve its freshness but deteriorates quickly upon exposure to the atmosphere. Moreover, frequent handling for purposes of slicing is undesirable and attempts to retain the wrapping are generally unsatisfactory and hinder the slicing operation. Also, the cutting of accurate and of thin portions is difficult with the knives ordinarily available in home kitchens.

The present invention contemplates the overcoming of the above objections, and the fulfilling of a long-felt need, by providing an inexpensive article of manufacture in which are combined the functions of enclosed protective storage and of precision slicing.

Thus, the object of the invention is to simplify the construction as well as the means and mode of operation of a storage and slicing device as disclosed herein, whereby such device may not only be economically manufactured, but will be more efficient in use, adaptable to a wide variety of foods, having relatively few parts, and be unlikely to get out of repair.

A further object of the invention is to facilitate the serving of individual portions retaining its original freshness from a food loaf, such as cheese or butter which is purchased in bulk and served in individual portions at intervals.

A further object of the invention is to enable the serving of individual portions of food with a minimum handling of the bulk supply thereof.

A further object of the invention is to combine a fixed professional type slicing mechanism with a support upon which the food may be placed for storage.

A further object of the invention is to provide a removable cover member so constructed and arranged as to cooperate with the support to enclose the food and slicing mechanism for protective storage.

A further object of the invention is to provide a device of the character described which is of attractive appearance and easily cleaned.

A further object of the invention is to provide a device possessing the advantageous structural features, the inherent meritorious characteristics and the mode of operation herein mentioned.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawings, wherein is found the preferred but obviously not necessarily the only form of embodiment of the invention, Fig. 1 is a perspective view of an article of manufacture made in accordance with the present invention, the cover being partly broken away to show the slicing mechanism;

Fig. 2 is a fragmentary view in perspective of the slicing mechanism and support therefor, showing the cutter element in partly raised position;

Fig. 3 is an enlarged fragmentary top plan view of the support or base member;

Fig. 4 is an enlarged view similar to Fig. 3, taken from the underside of the base member; and Fig. 5 is an enlarged fragmentary view of the base member in longitudinal section, showing the manner in which posts comprised in the slicing mechanism are set in the base.

Like parts are indicated by similar characters of reference throughout the several views.

Referring to the drawings, an article of manufacture embodying the present invention comprises a base member 10, which because of advantages in weight, cost of manufacture and ease of cleaning is made of a molded plastic. The base is generally rectangular in form and is hollow, being integrally formed from a sheet of plastic material turned over at its edges and interiorly intersected by longitudinal and transverse reinforcement ribs 11 and 12 (see Fig. 4).

The top of the base member 10 presents a flat work surface 13 on which the food loaf, stripped of its wrappings, is supported and held for slicing. Adjacent one end of the base and projecting upward from the work surface 13 is a pair of posts 14 permanently set into the mold of the base in the manner indicated in Fig. 5. As shown therein, the underside of the base 10 is formed with spaced bosses 15 connected by a transverse rib 16. One end of each post 14 is set in a respective boss 15, and, as shown, may be formed with a peripheral groove 17 into which the material of the base flows for a secure mounting.

The posts 14 are arranged in parallel spaced apart relationship, each adjacent a respective side edge of the base. The spacing of the posts is predetermined in accordance with the maximum width of the food loaf to be accommodated. Formed integrally with the base 10 and projecting upward from the work surface 13 is a longitudinal abutment 18 arranged along one side of the base and acting as a guide to align the food loaf with the posts 14.

There is mounted upon the posts 14, for vertical reciprocatory movement, a cutter element comprising frame 19, a cutting wire 21 and slide brackets 22. The frame 19 is of inverted U shape, being formed with parallel leg portions 23 in front of the posts 14 and extending toward the base 10, and with an interconnecting handle portion 24 by which the frame may be manually grasped and reciprocated vertically relative to the posts 14 and to the base.

The brackets 22 connect the frame 19 to the posts 14. Each has a web-like shape and comprises spaced loop portions, one surrounding a respective leg 23 of frame 19 and the other surrounding a respective post 14. The bracket 22 is fixed relative to the frame 19, being clamped or otherwise secured to the legs 23, but is slidable relative to the posts 14. Thus, the frame 19 is connected to the posts 14 for vertical sliding motion relative thereto.

The cutting wire 21 is made of thin but strong wire stock conventional in food cutting devices, and is stretched between the lower free ends of the legs 23 of frame 19. The wire surrounds a respective leg 23 at its opposite ends and may be received in peripheral grooves formed in the legs. To insure tautness in the wire 21, the frame 19 is so made that the legs 23 thereof are relatively movable toward and away from one another and tend toward divergent expansion. Accordingly, the legs may be pressed together slightly in installing the cutting wire 21 so that release and attempted expansion of the legs will impart to the wire the desired tension. Installation of the cutting wire preferably is made when the cutter assembly, including the brackets 22, is removed from the posts 14. Following installation, the assembly is placed upon the posts 14 and thereby held in its set position of expansion and tension.

The posts 14, frame 19 and brackets 22 preferably are made of metal, the frame and posts of bar stock. A chrome plated surface on the metal parts enhances their appearance and facilitites cleaning thereof.

The construction and arrangement of parts accordingly is such that the food loaf properly held on the work surface 13 against abutment 18 may be advanced axially relative to the posts 14 and cutter frame 19 to present any desired portion thereof to be severed from the whole by a downward cutting stroke of the frame 19 and the wire 21 forming a part thereof. That is, while the frame 19 is held in an upper position upon the posts 14, the food loaf is moved beneath the wire 21. When set for a portion of desired thickness the frame is pressed downwardly, causing wire 21 to pass through the loaf and to slice or sever therefrom the selected serving.

Beneath the cutter frame 19 there is formed in the work surface 13 connected recesses complementary to and receiving the ends of the legs 23 and the cutting wire 21. As shown in Fig. 4, the underside of the base member 10 is formed with laterally spaced bosses 25 connected by a transverse rib 26. Within the material of these formations there is respectively formed spaced recesses 27 and an interconnecting transverse recess or slot 28. The recesses 27 receive the ends of the legs 23 while the transverse slots 28 receive the cutting wire 21. The arrangement is such that the wire 21 is permitted to pass through and beyond the plane of the work surface 13 on its cutting stroke in order that a full cut through the food loaf may be made. The arrangement further is such as to reduce the normal or collapsed height of the cutter assembly in a manner simplifying enclosure thereof.

The peripheral edge of the base member 10 is cut away or recessed to define a ledge 29 in a plane below the work surface 13. The ledge 29 provides a place of contact or rest for a recessed cover element 31.

The cover element 31 is a unitary part made, like the base 10, of molded plastic, preferably clear for transparency. It is shaped to surround or enclose the work surface 13, the food loaf supported thereon and cutter assembly, including posts 14, so as to define with the base member 10 a container for storage of the food loaf. The marginal edge of the cover 31 rests upon ledge 29 in contacting relationship to the peripheral edge of work surface 13 and is externally aligned with the base member 10. The base 10 and cover 31 may, as shown, have a sloping contour at their sides and fronts and each element is made complementary to the other so that the outline of the container as a whole is regular and symmetrical. The cover member fits closely upon the ledge 29 and functions to preserve the freshness of the food loaf and to protect both the food and cutter mechanism from deposit of foreign material.

The cover 31 normally is in place upon the base 10, with the device functioning as a container and being stored in the household refrigerator or like place. Preparatory to serving, the cover 31 is removed, in effect to transform the device into a food supporting and slicing mechanism. The simple, attractive design of the device and the facility with which the slicing operation may be performed makes the device not unsuitable for direct table use if desired.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

A food slicing device, including a base member upon which a food loaf may be placed for storage, a pair of upstanding guide posts adjacent one edge thereof and permanently secured within the base member, a slicing member engageable with said posts for reciprocatory movement relative thereto, said member including an inverted U-shaped resilient frame element, a slicing element extending transversely thereof and detachably engageable with the legs thereof under the inherent resiliency of the frame element, the construction and arrangement being such that the slicing element is always retained under tension, and interconnecting links fixedly secured to the U-shaped frame element and engageable about the guide posts for reciprocatory motion relative thereto, said links maintaining the frame element in parallel spaced relation with the guide posts, and a transversely extending recess in the base in aligned relation with the slicing member, the ends of said recess being enlarged to receive the ends of the U-shaped frame element while the slicing element is received within the central portion of the recess intermediate the enlarged ends thereof, the construction and arrangement being such that the slicing element may pass completely through a food loaf resting upon the base.

HAROLD F. TAYLOR.

REFERENCES CITED

The following references are of record in the file of this patent:

UNITED STATES PATENTS

| Number | Name | Date |
|---|---|---|
| 899,103 | Ditson | Sept. 22, 1908 |
| 926,304 | Thompson | June 29, 1909 |
| 1,175,212 | Wilson | Mar. 14, 1916 |
| 1,499,235 | Livingston | June 24, 1924 |
| 1,605,770 | Potter | Nov. 2, 1926 |
| 1,715,210 | Pedersen | May 28, 1929 |
| 1,721,937 | Williams | July 23, 1929 |
| 1,822,581 | Brown | Sept. 8, 1931 |
| 1,848,186 | McDonald | Mar. 8, 1932 |
| 2,027,193 | Rappold | Jan. 7, 1936 |
| 2,080,283 | Lowenfels | May 11, 1937 |
| 2,251,844 | Keefer | Aug. 5, 1941 |
| 2,343,448 | Fay | Mar. 7, 1944 |

FOREIGN PATENTS

| Number | Country | Date |
|---|---|---|
| 4,357 | Great Britain | A. D. 1900 |
| 39,732 | France | Nov. 24, 1931 |
| 765,150 | France | Mar. 19, 1934 |
| 844,111 | France | Apr. 11, 1939 |